United States Patent [19]

Yoshida et al.

[11] 4,217,018
[45] Aug. 12, 1980

[54] ELECTRICAL SUPPLY TRACK

[75] Inventors: Makoto Yoshida, Moriguchi; Nobutsugu Nagashima, Neyagawa; Akihiro Suzue, Hirakata; Ryuichi Kitagawa, Hikone; Misao Namikawa, Kusatsu, all of Japan

[73] Assignee: Matsushita Electric Works, Ltd., Osaka, Japan

[21] Appl. No.: 937,829

[22] Filed: Aug. 29, 1978

[30] Foreign Application Priority Data

Aug. 31, 1977 [JP] Japan .............................. 52-105288

[51] Int. Cl.³ .......................... H01R 9/00; H02G 5/04
[52] U.S. Cl. ................................................. 339/21 R
[58] Field of Search ...................... 339/20, 21 R, 22 R, 339/22 B, 218 R, 218 M; D13/13, 40; 264/135; 267/140

[56] References Cited

U.S. PATENT DOCUMENTS

| D. 131,025 | 1/1942 | O'Brien | D13/13 |
| D. 210,287 | 2/1968 | Venema | D13/40 |
| 3,179,397 | 4/1965 | Cleereman | 267/140 |
| 3,352,955 | 11/1967 | Pigott et al. | 264/135 |
| 3,753,209 | 8/1973 | Hesse | 339/21 R |

*Primary Examiner*—Neil Abrams
*Attorney, Agent, or Firm*—Burns, Doane, Swecker & Mathis

[57] ABSTRACT

Improved channel shape electrical supply track for holding and supplying electric power to electric equipments such as spot light is provided with high mechanical strength and yet refined appearance. An elongated core case of steel plate bent into a channel shape substantially of C-shape in section is covered over inner and outer surfaces with molded synthetic resin. An inner layer of the resin covering includes a pair of opposing and parallelly elongated members simultaneously molded with the layer for supporting inside the case core a pair of elongated conductive members embedded in opposing ends of the supporting members and exposed for electrical contact with plug blades of the equipment.

1 Claim, 6 Drawing Figures

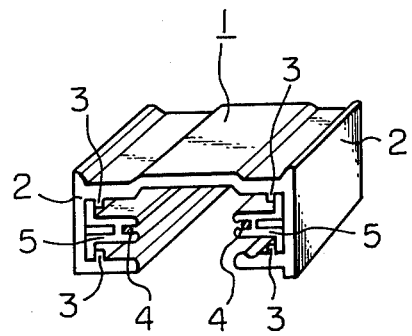
Fig. 1 (PRIOR ART)
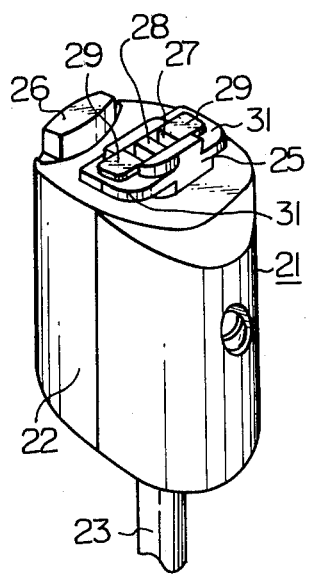
Fig. 2B
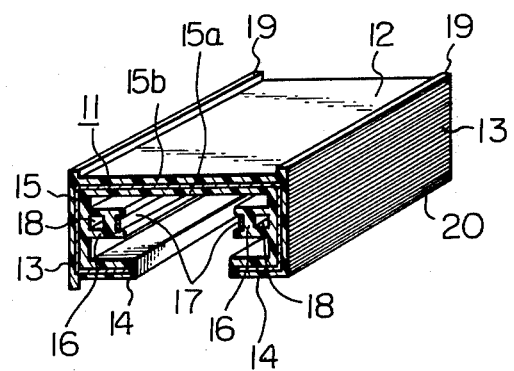
Fig. 2A
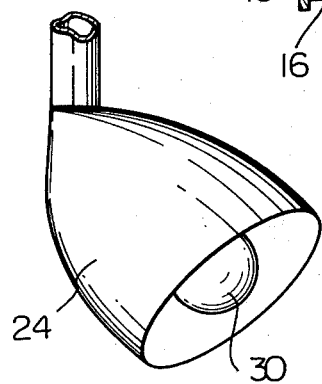

ELECTRICAL SUPPLY TRACK

The present invention relates to electrical supply tracks and, more particularly, to improvements in the electrical supply track mounted to ceiling surface for supplying electric power to such electric equipments as lighting fixtures and the like.

Conventionally, such a track constructed as shown in FIG. 1 has been generally used as the electrical supply track of the kind referred to. In the drawing, a case 1 made of, for example, aluminium by an extrusion in an elongated channel shape has a pair of longitudinally opposing side walls 2, which hold respectively an insulative supporting member 5 generally of a synthetic resin which is retained at its base part by projected members 3 so as to dispose an elongated conducting member 4 provided at its projected edge in parallel and opposing relation to the member 4 of the other supporting member 5. As represented by this example, the conventional supply tracks generally employ as the outer case an extrusion molding of aluminium which allows to easily achieve high dimensional precisions and to render any surfacial anti-corrosion treatment to be unnecessary and, in order to support the conductive members in such outer case for the electrical supply, the conductive members are held by the respective supporting members made of an insulative material whereas the supporting members are secured in the outer case. In such conventional tracks, on the other hand, manufacturing costs have been high since the outer case comprises the extrusion molding of aluminium which is expensive and the structure and assembling for fixing the conductive members inside the case as electrically insulated therefrom are rather complicated. Also, required dimensional precision for proper contact of the respective conductive members in the track with plug contactors on the side of the electric equipments is hard to achieve when mounting the conductive member in the case even though aluminium extrusion molding can maintain the dimensional precision, if achieved, is employed as the outer case, whereby the electric contact between the track and the equipment is apt to be unreliable.

In the above structure, further, the surface treatment is necessary to protect the surface of the metallic case 1 from corrosion while the mechanical strength can be achieved by the metallic case. It is also necessary to mount the supporting members 5 with the conductive members 4 to the side walls 2 of the case 1. In this case, the mounting by means of calking of the projecting members 3 or of an adhesive is troublesome and difficult, since the case 1 and the supporting members 5 are separately fablicated and assembled together so that mutual dimensional precision of the conductive members 4 in their opposing position cannot be well achieved.

While the supply track of the kind referred to is generally used at the time of installation as cut by means of a saw or the like into the predetermined length, the structure of the conventional track disclosed often causes mutual positional fluctuations between the outer case and the respective conductive members at the time of the cutting work, since these separately prepared elements are assembled together by means of the calking or adhesion. Due to this, specifically when the supply track is to be extended through a connector by butting mutually the cut end surfaces of the tracks, the surfaces to be joined may not match each other and the electric equipment to be coupled to the track may not be moved smoothly along the track.

Since the appearance of the case simply made of metal is not much attractive and its colouring is restricted, the conventional tracks of the above structure is rather difficult to be widely used in harmony with room decorations.

The present invention has been suggested to remove such defects as described above.

According to the present invention, the above defects are successfully solved by forming an outer case with a steel plate subjected to bending work and a synthetic resin layer formed intimately over the entire inner and outer surfaces of the bent steel plate used as a core, and then forming an electrical supply track by embedding conductive members with which plug contactors of the electric equipment are to contact in the resin layer on the side of the inner surface of the case, simultaneously with the forming of the synthetin resin layer. That is, the present invention has well removed the defects of the conventional devices by reducing manufacturing cost with the use of the inexpensive steel plate as the outer case core while increasing its mechanical strength, and compensating for any poor dimensional precision of the bent steel plate and necessity of the surfacial treatment with the formation of the covering synthetic resin layer.

The principal object of the present invention is to provide an electrical supply track which is excellent in the dimensional precision and yet inexpensive, high in the mechanical strength maintained by a case core of steel plate subjected to bending work and also in the dimensional precision achieved by embedding conductive members in covering layer of synthetic resin at the time of forming the layer.

Other object of the present invention is to provide an electrical supply track which has good conductivity and superior in heat radiation.

Other object of the present invention is to provide an electrical supply track which formly supports electric equipment and is so excellent in impact resistance that, if a foreign body hits the outer case of the track, it is scarcely damaged.

Another object of the present invention is to provide an electrical supply track which can prevent electric equipment from becoming inferior by employing synthetic resins such as hard PVC.

Further object of the present invention is to provide an electrical supply track which is superior in insulating performance and thus in the safety.

Still further object of the present invention is to provide an electrical supply track which is good in ornamental appearance and capable of matching with wide variations of interior design.

The other objects and advantages of the present invention will be clearly understood from the following description of the invention detailed with reference to preferred embodiments shown in attached drawings, in which:

FIG. 1 is a fragmental perspective view of a typical conventional electrical supply track;

FIG. 2A is a fragmental perspective view of an embodiment of electrical supply track according to the present invention showing its structure in section;

FIG. 2B is a perspective view of an electric equipment to be employed in combination with the electrical supply track of the present invention;

Figure 3:
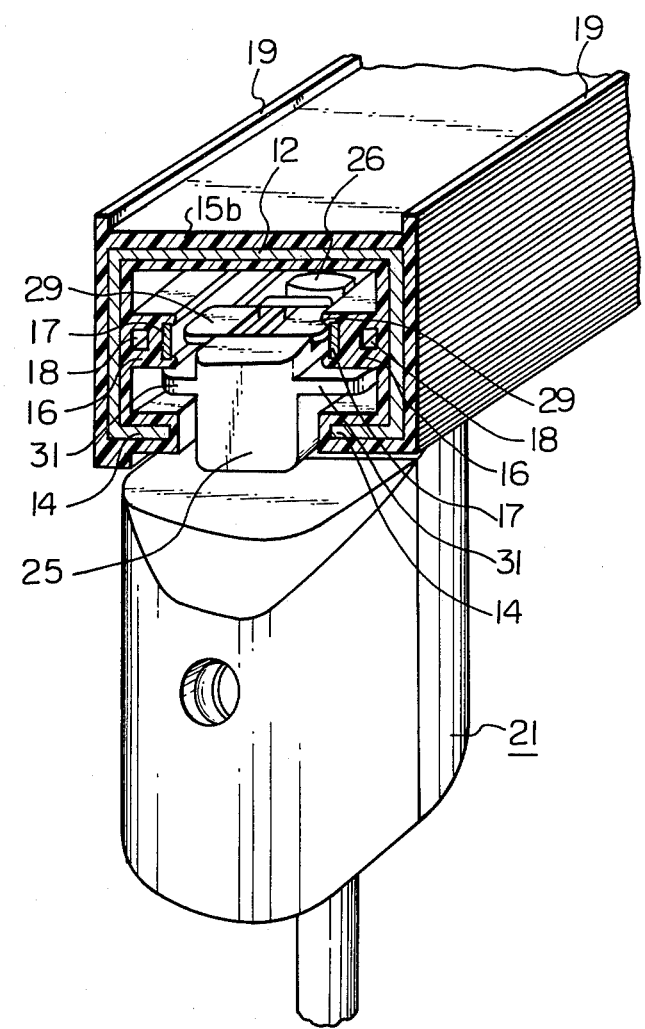
FIG. 3 is a view illustrating a state in which the electrical supply track of the present invention is used.

In FIG. 2A, an electrical supply track of the present invention is shown, wherein an opening is provided in the lower portion of a channel-shaped case core 11, which comprises an upper piece 12, side pieces 13 bent vertically from both longitudinal side edges of the upper piece 12 and projected pieces 14 respectively bent inward and in parallel to the upper piece from respective ends of the side pieces 13. These projected pieces 14 are employed as supporting edges for hanging type electric equipments.

The case core 11 is formed of a steel plate bent into the formation as above and a synthetic resin layer 15 is molded all over the inner and outer surfaces so that the layer will comprise an inner surface layer 15a and an outer surface layer 15b. More particularly, said layer 15 is molded on the inner and outer surfaces of the case core 11 with an interposed adhesive layer of vinyle chloride coated on the respective surfaces, whereby the resin layer 15 adheres intimately to the case core 11, thus allowing no air layer to exist between the resin layer and the surface of the case core so as to protect the steel made case core from oxidation without causing any rust while having the thermal conductivity and heat radiation improved. A pair of supporting members 16 extending longitudinally in parallel to each other and projecting laterally inward to oppose each other are integrally formed simultaneously with the molding of the inner layer 15a. At the laterally innermost edge of the respective supporting members 16, a conductive member 17 having an exposed surface and extending longitudinally in parallel to the other member is embedded at the same time when the supporting members 16 are formed. The supporting members 16 in which the conductive members are embedded are formed to be thick enough for achieving a proper mechanical strength and provided with a cavity 18 in the center.

In the present invention, preferably, the inner layer 15a specifically in the vicinity of the conductive member 17 is coated thicker than the outer layer 15b for increasing the insulating performance. Further, the inner layer 15a is constituted of a synthetic resin comprising vinyle acetate-copolymerized vinyle chloride or the like for firmly holding the conductive members 17. The outer layer 15b is of an elastic soft synthetic resin for absorbing any external impact. Furthermore, the synthetic resin used for coating the projected pieces 14 projecting from the lower part of the case core 11 is the one which does not contain any solvent such as hard PVC.

On both side ends of the upper piece 12, projections 19 are provided longitudinally so that the track can be secured stably to the ceiling surface or the like.

It is preferable that many thin grooves 20 are provided longitudinally on the entire surface of the outer layer 15b of the track except the upper piece 12, making the surface uneven. Generally, the outer layer is preferably thin, but the thickness should be properly determined for not causing any non-uniform molding of the layer. If the layer is formed unevenly as described above, the grooves which acting as a pool of the synthetin resins facilitate the flow of layer material, so that the layer can be prevented from being formed improperly. Also, the uneven surface of the outer layer acts as a matted surface, whereby any reflection of light such as a spot light can be prevented and a decorative effect can be brought about.

In FIG. 2B, there is shown an example of a hanging type electric equipment 21 to be used as mounted to the supply track of the present invention. The equipment 21 comprises a plug cover body 22, a cord guiding pipe 23 secured at an end to the lower part of the body 22, and a spot light 24 shown as an example and secured to the other end of the pipe 23.

Substantially at the center of the upper surface of the body 22, a projection 25 is provided to extend upward, and a retractable stopper 26 is provided adjacent an end edge of the upper surface for preventing axial rotation of the plug body 22. In the plug body 22 and projection 25, there is provided a through hole 27 which communicates with the bore of the cord guiding pipe 23, and this through hole 27 is longitudinally separated into two spaces by an insulative wall 28 positioned in the center of the hole. The projection 25 secures a pair of plug blades 29 at the upper end, each of which is positioned adjacent the respective two spaces of the hole 27, and these blades 29 extend in opposite directions and substantially at right angles with respect to the longitudinal axis of the body 22 and are connected to lead wires of the cord (not shown) passed through the hole 27 and pipe 23, which wires being connected with a light bulb 30 mounted to the spot light 30. Intermediate between the respective plug blades 29 and the upper end surface of the plug body 22, the projection 25 is provided with a pair of receiving projections 31 formed integrally with the projection 25 so as to extend in the same directions with the plug blades 29.

In FIG. 3, there is shown a state in which the hanging type electric equipment 21 is mounted to the electric supply track of the present invention.

In performing the mounting, the track is first fixed to a ceiling surface or the like desired by means of screws (not shown). In this case, the projections 19 formed on the outer layer 15b covering the upper piece 12 of the track enable it possible to stably fix the track to the desired surface. The equipment 21 is brought into abutment with the track in such manner that the plug blade 29 and receiving projections 31 of the projection 25 are passed through the lower opening of the track with their extending directions aligned with the longitudinal direction of the opening, and then the equipment 21 is rotated by 90° about its longitudinal axis, whereby tip ends of the plug blades 29 which are provided with a resiliency in their extending directions are brought into contact with the exposed surfaces of the conductive members 17 embedded in the supporting members 16 and the lower surfaces of the receiving projections 31 are slidably placed on the inner surface of the projecting pieces 14 of the track. In this case, the retractable stopper 26 being biased in the direction of the longitudinal axis of the plug body 22 is first caused to be retracted by the lower surface of one of the projecting pieces 14 as the blades 29 and projections 31 are passed through the track opening but, after the 90° rotation of the equipment, the stopper 26 is caused to enter the opening and sit between the opposing conductive members 17 and projecting pieces 14 so that the axial rotation of the equipment will be thereby prevented.

The cavities 18 formed in the supporting members 16 are effective to absorb a pressure exerted to the supporting members by the plug blades 29 and also any gap between the conducting members 17 and the plug blades 29 with the resiliency provided by the cavities, so that an electrically stable contact can be obtained while effectively dissipating any heat produced between contacting surfaces.

As the projecting pieces 14 on which the receiving members 31 are placed are coated with the synthetic resin material without containing any solvent, the receiving members 31 can be prevented from being deteriorated even if the receiving members 31 are made of such material which is weak to solvents as polycarbonate.

Figure 4:
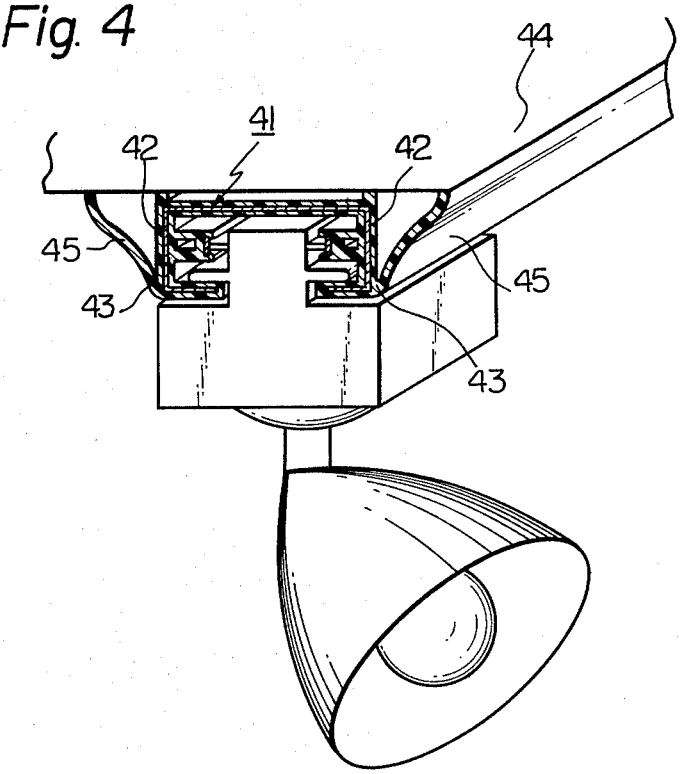
FIGS. 4 and 5 show other embodiments of the present invention.

In FIG. 4, another embodiment of the present invention is shown. This embodiment is different from the one shown in FIG. 2A in that there are formed fins 45 of synthetic resin extending upward to the ceiling surface 44 from the lower part of the coating layer 43 of synthetic resin coated on the side pieces 42 forming the case core 41. As compared with fins made of a metal, these fins of synthetic resin are higher in the resiliency so that they can neatly abut the ceiling surface and provide favorable finish of the installation and thus fine appearance.

Other structure and operation of this embodiment are substantially the same as the above described embodiment and need not be detailed here.

Figure 5:
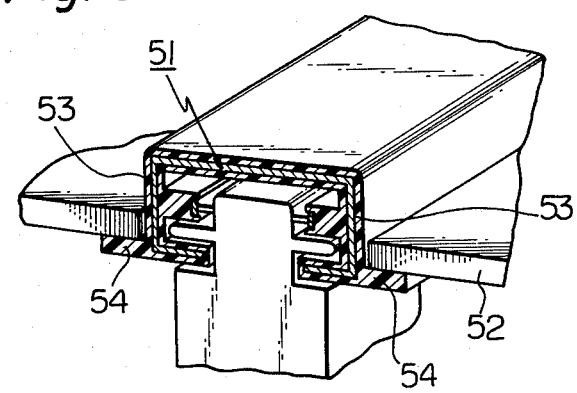

FIG. 5 shows still another embodiment of the present invention, in which a case core 51 is formed to be embedded in the ceiling 52 and a pair of fins 54 of synthetic resin are provided integrally extend outward from the lower part of both side pieces 53 of the case core over the length of the track, so that the track can be fitted to the ceiling surface of these fins 54. Other structure and operation of this embodiment are substantially the as those of the embodiment shown in FIG. 2.

With the above described arrangement, the present invention shows the followi ng effects:

1. The electrical supply track of the present invention is formed by coating the channel-shaped case core 11 of steel plate bending-worked into the shape with a synthetic resin over the inner and outer surfaces and embedding the electrical conductive members 17 in the inner coated layer 15a simultaneously with the molding of the inner layer 15a, so that the electrical supply track maintains the mechanical strength for holding the hanging-type electric equipment 21 and requires no anti-corrosion surface treatment. Thus the manufacture of the track and its production cost are made easy and inexpensive and the entire dimensional precision is made high. It is also effective in providing remarkably low cost electrical supply track that the steel plate which is an inexpensive material and still fulfils respective requirements of the product is employed, and that only such simple steps as the bending work of the plate and extrusion molding work of the synthetic resin are required.

2. Since the coating layer 15 formed of synthetic resin intimately adheres to the inner and outer surfaces of the case core 11 through the adhesive agent, no air layer exists between the case core surface and the coating layer 15, whereby the thermal conductivity of the entire track is made high, and any heat generated at the conductive members 17 can be well radiated through the layer. Further, any inferior phenomenon being not produced resulting in giving the anticorrosive effect, the thermal defects of the coating layer formed of synthetic resins comparatively inferior to a metal in heat-resistance being improved, and the provision of the inner and outer synthetic resin layers 15a and 15b ensure the insulative effect over the entire surfaces of the metallic case core and thus a high safety performance of the track.

3. Since the inner layer 15a is formed of a hard synthetic resin, the conductive members 17 can be firmly held and, since the receiving members 31 of the hanging-type electric equipment 21 are placed on the projecting pieces 14 through the hard resin inner layer 15a coated on the case core 11, the equipment 21 can be freely slid along the track, while the layer 15a is high in the resistance to thermal deformation. Further, the outer layer 15b formed of soft synthetic resin provides the supply track with an excellent anti-shock performance.

4. Since the coating layer 15 covering the projecting pieces 14 which hold the electric equipment 21 is formed with a resin material containing no solvent as plasticizer, the receiving members 31 of the electric equipment 21 may not be deteriorated in their mechanical strength even if the equipment is formed of policarbonate which is weak to the solvent, so that the mounting of the equipment to the track can be maintained stable for long.

5. As the thickness of the inner layer 15a in the vicinity of the conductive members 17 is made large than that of the outer layer 15b, the flow of molding material is favorable, required high dimensional precision of the molded layer can be easily achieved and the sufficient strength for holding the conductive members 17 can be also easily obtained.

6. Since the entire surface of the outer layer 15b, except the upper portion of the upper piece 12 of the case core, is formed uneven, such uneven surface is effective to act as the pool of molten molding material, enhancing the flow of the material to be favorable, reducing the reflection of any light with the mat finish and giving no influence on the interior decoration of housing, while the layer can be made thin.

7. Since the outer layer 15b is coated on the outer surface of the case core 11, the cutting of the track into the required length by means of the saw or the like can be positively performed without causing any slipping of saw teeth, so that cut end surface can be made smooth, while any metallic burr due to the saw teeth can be absorbed in the coating layer so that the worker can be protected from being injured by the burr.

8. The fins 45 of synthetic resin formed integrally with the side pieces 42 of the case core enable it possible to improve the appearance of the track after being installed to the ceiling surface or the like.

What is claimed is:

1. An electrical supply track comprising a case core of a steel plate formed into a channel shape having a longitudinal aperture, a coating of a synthetic resin formed intimately on the inner and outer surfaces of said core plate, said coating comprising an inner layer formed on the inner surface and an outer layer on the outer surface of the core plate, a pair of supporting members molded integrally with the inner layer and projecting in a lateral direction inwardly into the aperture to oppose each other and extend in the longitudinal direction of the track in parallel relation to each other, and a pair of conductive members embedded in respective opposing laterally innermost ends of said supporting members simultaneously with said molding of the supporting members so as to be exposed at opposing surfaces of the supporting members and to extend parallel to the longitudinal direction of the track, said inner layer being made of synthetic resin which is harder than that of said outer layer, portions of said inner layer disposed between said conductive members and said cor e plate being thicker in said lateral direction than said outer layer.

* * * * *